May 15, 1945.  G. H. ERIKSSON  2,375,982
DEPTH GAUGE
Filed Jan. 17, 1944
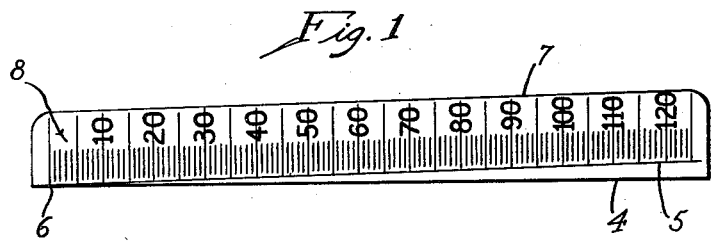
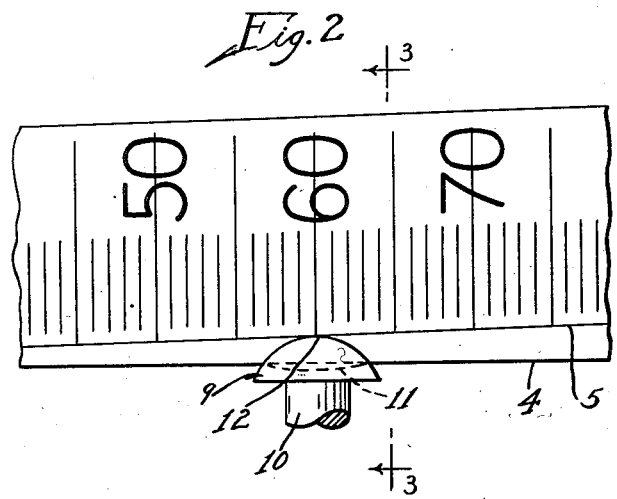
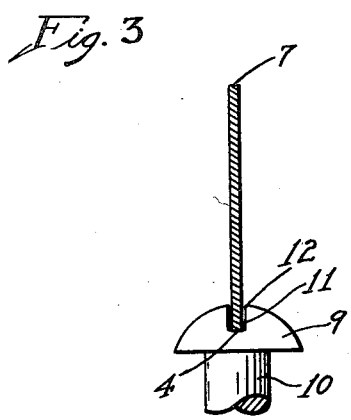
Inventor:
Gustav H. Eriksson
By Edward A. Morsbach, Atty Patented May 15, 1945

2,375,982

UNITED STATES PATENT OFFICE 2,375,982

DEPTH GAUGE

Gustav H. Eriksson, Rockford, Ill.

Application January 17, 1944, Serial No. 518,500

1 Claim. (Cl. 33—69)

This invention relates to depth gauges and has for its primary object the provision of a gauge adapted particularly for gauging and measuring the depth of slots, such as the slots in the heads of screws, bolts, and the like, the instrument being so designed as to give the required information quickly and conveniently with sufficient accuracy for ordinary requirements.

Another object of the invention is the provision of a depth gauge adapted when inserted into a slot to give a direct reading of the depth dimension without adjustment of parts or other time consuming operation, the gauge having a novel scale arrangement for making the tool for direct reading.

Other objects and attendant advantages will appear from the following description and the accompanying drawing, in which—

Figure 1 is a full sized side view of one embodiment of my invention;

Fig. 2 is a fragmentary view about three times actual size, showing the gauge inserted in the slot of a screw, and Fig. 3 is a section on the line 3—3 of Fig. 2.

According to the present embodiment of the invention, the gauge is made of a strip of sheet metal similar to a conventional machinist's scale though obviously it may be formed of other material, such as plastics, where conditions permit or circumstances indicate the desirability of so doing. The strip should be of relatively thin material so as to be insertible into narrow slots in the manner indicated in Fig. 3, and accordingly is preferably of relatively thin stock high grade steel so tempered as to resist permanent bending. One side edge, as indicated by the numeral 4, is carefully formed so as to provide a straight edge, accurately straight within the limits of accuracy of the tool, this edge extending from end to end of the strip. Adjacent this edge of the strip is a straight line 5 disposed on one side face of the strip, this line converging with the straight edge 4 at the point 6 adjacent one end of the rule corresponding to zero depth and extending longitudinally of the strip, the line diverging from the straight edge 4 in a uniform manner. Positioned on the same side of the strip and disposed between the straight line 5 and the opposite side 7 of the strip are graduations indicated generally by the numeral 8, these graduations extending from end to end of the straight line 5, each tenth graduation bearing a number disposed on the face of the strip in the fashion common in distance measuring scales. The distance between each line of the graduations is such that the number of the graduations starting from the zero point of the scale corresponds with the distance between the straight edge 4 and the line 5 at the point where this particular graduation intersects or would intersect the line 5 so that at any point along the graduations the number of any particular graduation indicates the distance between the straight edge 4 and the line 5 at this point.

Referring now more particularly to Figs. 2 and 3, in use the gauge is fit edgewise in the slot, the distance of which is to be measured. For example, in this instance, the numeral 9 designates the head of a conventional screw or bolt 10 having the usual slot 11 commonly employed for the insertion of a screw driver for the purpose of driving the screw or rotating the bolt. In measuring the depth of this slot the gauge is inserted edgewise therein until the straight edge 4 rests against the bottom of the slot. The gauge is then moved along the slot until a point on the line 5 coincides with the plane of the outer end of the screw head, as indicated at 12. When the gauge is so positioned the graduation disposed directly opposite this point on the straight line 5 represents the depth of the slot in thousandths, as, for example, in Fig. 2 the slot is shown as having a depth of sixty thousandths.

It will be seen that this provides a novel and convenient scale for measuring the depth of slots. The gauge is easy to operate, requires no adjustment of parts or complicated settings in order to obtain the measurements and the measurements are ready directly from the graduations. Furthermore, experience has shown that because of the manner in which the straight line 5 is matched with the plane of the outer surface of the object, the measurements are considerably more accurate than would at first be supposed, and I have found that the average workman can match these lines with considerable accuracy by observation with the naked eye. In most instances, the accuracy will be found to be within two to three thousandths, depending upon the eyes of the workman. Furthermore, the gauge appears to give unusual uniformity in measurement as between different workmen and the human error appears to be considerably less than might at first be expected. The device is, therefore, suitable for making rapid and reasonably accurate measurement of slot depth and the device is relatively inexpensive.

I claim:

As an article of manufacture, a depth gauge comprising a thin strip of stiff material having a straight edge along its longest dimension, a straight line disposed on a side face thereof extending longitudinally of the strip and digressing at a uniform rate from said straight edge defining a portion therebetween of substantially uniform thickness, and graduations disposed on and extending laterally of said side face along said line, said graduations representing the distance between said line and said straight edge at the points of intersection between the graduations and the line, whereby when the gauge is inserted in a slot of an object with the straight edge against the bottom thereof, the depth of the slot from the outer surface is indicated by the particular graduation at the point where said line is disposed in the same plane as said outer surface.

GUSTAV H. ERIKSSON.